United States Patent
Nishiki et al.

(10) Patent No.: US 9,272,380 B2
(45) Date of Patent: Mar. 1, 2016

(54) CHIP CONVEYER FOR MACHINE TOOL

(71) Applicant: DMG MORI CO., LTD., Nara (JP)

(72) Inventors: Takahiro Nishiki, Nara (JP); Takenori Nishizawa, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/727,003

(22) Filed: Jun. 1, 2015

(65) Prior Publication Data

US 2015/0343584 A1    Dec. 3, 2015

(30) Foreign Application Priority Data

May 30, 2014   (JP) .................. 2014-112908

(51) Int. Cl.
| | |
|---|---|
| B65G 19/14 | (2006.01) |
| B23Q 11/00 | (2006.01) |
| B65G 37/00 | (2006.01) |
| B23Q 11/08 | (2006.01) |

(52) U.S. Cl.
CPC ............ *B23Q 11/0057* (2013.01); *B23Q 11/08* (2013.01); *B65G 19/14* (2013.01); *B65G 37/00* (2013.01)

(58) Field of Classification Search
CPC ........ B65G 19/12; B65G 19/14; B65G 19/16; B23Q 11/0057; B23Q 11/0042; B23Q 11/08
USPC ................ 198/498; 409/137; 210/298, 526
See application file for complete search history.

(56) References Cited

U.S. PATENT DOCUMENTS

| | | | | |
|---|---|---|---|---|
| 5,992,642 A | * | 11/1999 | Ota ..................... | B01D 33/04 210/394 |
| 6,315,106 B1 | * | 11/2001 | Hirano ............... | B23Q 11/0042 198/542 |
| 6,332,983 B1 | | 12/2001 | Tashiro et al. | |
| 6,511,597 B2 | | 1/2003 | Hori et al. | |
| 7,364,032 B2 | * | 4/2008 | Nisiguchi .......... | B23Q 11/0057 198/495 |
| 2002/0134648 A1 | * | 9/2002 | Enomoto ........... | B23Q 11/0057 198/495 |
| 2011/0005985 A1 | * | 1/2011 | Dietenhauser ......... | B01D 29/01 210/171 |

(Continued)

FOREIGN PATENT DOCUMENTS

| | | |
|---|---|---|
| JP | 2001-79730 A | 3/2001 |
| JP | 2002-331438 A | 11/2002 |

OTHER PUBLICATIONS

English Abstract of JP2001-79730, Publication Date: Mar. 27, 2001.

(Continued)

*Primary Examiner* — Mark A Deuble

(57) ABSTRACT

A chip conveyer for a machine tool includes a casing including a chip introducing port and a chip discharging port, and a chip carrying mechanism arranged in the casing so as to extend from the chip introducing port to the chip discharging port. Chips dropped in the casing through the chip introducing port are carried to the chip discharging port by the chip carrying mechanism. A partition plate partitioning an inside of the casing up and down is arranged in the casing, and a portion of the partition plate below the chip introducing port is configured to be openable and closable. A carrying direction of the chip carrying mechanism when the partition plate is in an open state and a carrying direction of the chip carrying mechanism when the partition plate is in a closed state are set to be opposite directions.

9 Claims, 6 Drawing Sheets

(56) References Cited

U.S. PATENT DOCUMENTS

2012/0079928 A1* 4/2012 Hoshi ............... B23Q 11/0057
83/78
2012/0228084 A1* 9/2012 Chung ................ B65G 45/22
198/370.01

OTHER PUBLICATIONS

English Abstract of JP2002-331438, Publication Date: Nov. 19, 2002.

* cited by examiner

CHIP CONVEYER FOR MACHINE TOOL

CROSS-REFERENCE TO RELATED APPLICATION

This application claims priority to a Japanese Patent Application No. 2014-112908 filed on May 30, 2014, the entire content of which is incorporated herein by reference in its entirety.

BACKGROUND OF THE INVENTION

1. Field of the Invention

The present disclosure relates to a chip conveyer for a machine tool for discharging chips generated by machining a workpiece to an outside.

2. Description of the Related Art

The following description of related art sets forth the inventors' knowledge of related art and certain problems therein and should not be construed as an admission of knowledge in the prior art.

In a chip conveyer of this type, it is configured to drop chips on a partition plate arranged in a casing and scrape out the chips on the partition plate by scraping plates fixed to drive chains to an outside. In this case, the chips dropped on a bottom wall of the casing from the partition plate are returned to the partition plate by the scraping plates to be discharged (see, e.g., Japanese Unexamined Patent Application Publication No. 2001-79730 and Japanese Unexamined Patent Application Publication No. 2002-331438.

In the meantime, in the type of the aforementioned conventional technique, depending on the material, etc., of the workpiece to be processed, there is a case in which chips float in the cutting fluid tank and therefore the chips cannot be sufficiently scraped out by merely scraping out the chips dropped on the partition plate by the scraping plates.

There also is a type in which no partition plate is provided and chips dropped on the bottom portion of the cutting fluid tank of the casing are scraped out by scraping plates. However, dedicated chip conveyers for respective types were produced, which increased the production cost, and it was necessary for a user to select the type of chip conveyer mainly considering what workpiece is to be processed.

The description herein of advantages and disadvantages of various features, embodiments, methods, and apparatus disclosed in other publications is in no way intended to limit the present invention. For example, certain features of the described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can improve upon existing methods and/or apparatuses.

The present disclosure has been made in view of the aforementioned conventional circumstances, and aims to provide a chip conveyer for a machine tool capable of assuredly discharging chips dropped on a partition plate and chips floating in a cutting fluid above a bottom wall portion of a casing, capable of eliminating a conveyer selection considering a material, etc., of a workpiece to be processed, and also capable of attaining a cost reduction.

According to a first aspect of the present invention, in some embodiments, a chip conveyer for a machine tool includes a casing including a chip introducing port and a chip discharging port, and a chip carrying mechanism arranged in the casing so as to extend at least from the chip introducing port to the chip discharging port. Chips dropped in the casing through the chip introducing port are carried to the chip discharging port by the chip carrying mechanism. A partition plate partitioning an inside of the casing up and down is arranged in the casing, and at least a portion of the partition plate below the chip introducing port is configured to be openable and closable. A carrying direction of the chip carrying mechanism when the partition plate is in an open state and a carrying direction of the chip carrying mechanism when the partition plate is in a closed state are set to be opposite directions.

According to some embodiments of the present invention, in the aforementioned chip conveyer for a machine tool, the chip carrying mechanism includes a pair of circular drive chains and scraping plates fixed to the drive chains in a bridged manner at predetermined intervals, and the portion of the partition plate below the chip introducing port is detachably provided so as to be taken out between adjacent scraping plates.

According to the some embodiments of the present invention, in the aforementioned chip conveyer for a machine tool, the portion of the partition plate below the chip introducing port is configured to be slidable so as to be positioned at a position adjacent to the portion of the partition plate.

According to a second aspect of the present invention, in some embodiments, a chip conveyer for a machine tool include a casing including a chip introducing port and a chip discharging port, a chip carrying mechanism arranged in the casing so as to extend from the chip introducing port to the chip discharging port, the chip carrying mechanism being configured to carry chips dropped in the casing through the chip introducing port to the chip discharging port, and a partition plate arranged in the casing so as to partition an inside of the casing into an upper space and a lower space. The partition plate includes an opening formed below the chip introducing port and a lid plate detachably closing the opening. The chip carrying mechanism is configured to change a driving direction thereof depending on whether the partition plate is in a closed state in which the lid plate closes the opening or the partition plate is in an open state in which the lid plate is detached from the opening.

In one embodiment of the chip conveyer of the invention, a portion of the partition plate below the chip introducing port is configured to be openable and closable, and a carrying direction of the chip carrying mechanism when the partition plate is in an open state and a carrying direction of the chip carrying mechanism when the partition plate is in a closed state are set to be opposite directions. Therefore, in the closed state of the partition plate, chips dropped on the partition plate are discharged by the scraping plates moving toward the chip discharging port. On the other hand, in the open state, chips dropped on the bottom portion of the casing via the opening of the partition plate, and the chips floated and deposited on the bottom portion are discharged by the scraping plates moving toward the chip discharging portion direction without using the partition plate.

As explained above, in some embodiments of the present invention, by merely switching the carrying direction (or the driving direction) of the chip carrying mechanism depending on whether the partition is in the open state or in the closed state, the discharging of chips dropped on the partition plate and the discharging of chips floated and deposited on the bottom portion of the casing can be performed. With this, it becomes possible to eliminate a conveyer selection considering the material, etc., of a workpiece to be processed, which in turn can eliminate the need of producing chip conveyers for respective types. As a result, the cost reduction can be attained.

In some embodiments of the present invention, the portion of the partition plate below the chip introducing port is provided in a detachable manner and is configured to be taken out between the adjacent scraping plates. Therefore, the opening/closing operation of the partition plate below the chip introducing port can be performed easily and assuredly.

In some embodiments of the present invention, the portion of the partition plate below the chip introducing port is configured to be slidable so as to be positioned at a position adjacent to the portion of the partition plate. The portion of the partition plate below the chip introducing port can be opened and closed without taking out the portion of the partition plate below the chip introducing port, and the opening and closing operation can be performed more easily and assuredly.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

Some embodiments of the present invention are shown by way of example, and not limitation, in the accompanying figures.

DETAILED DESCRIPTION OF EMBODIMENTS

Figure 1:
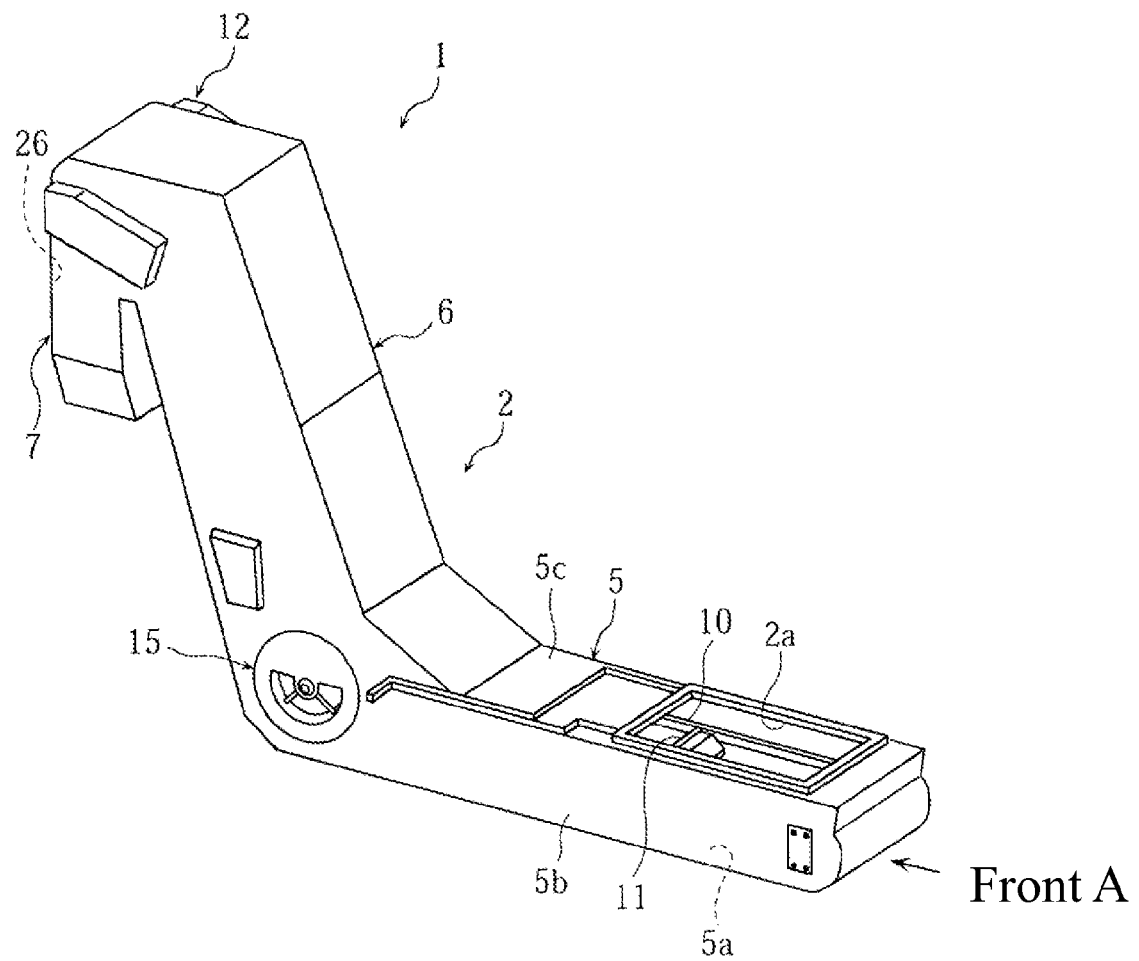
FIG. 1 is a perspective view of a chip conveyer for a machine tool according to Embodiment 1 of the present invention.

In the following paragraphs, some embodiments of the invention will be described by way of example and not limitation. It should be understood based on this disclosure that various other modifications can be made by those in the art based on these illustrated embodiments.

Hereinafter, embodiments of the present invention will be explained based on the attached drawings.

Embodiment 1

FIGS. 1 to 5 are drawings for explaining a chip conveyer for a machine tool according to Embodiment 1 of the present invention. In this embodiment, "front," "rear," "left," and "right" respectively denote "front," "rear," "left," and "right" when seen from a machine front A.

In the drawings, the reference numeral "1" denotes a chip conveyer of this embodiment. This chip conveyer 1 is mainly equipped with a casing 2 and a chip carrying mechanism 3. The casing 2 includes a chip introducing port 2a through which chips "a" generated by machining a workpiece by a machine tool (which is not illustrated) are dropped together with a cutting fluid (oil) "b" supplied to the workpiece processing portion, and a chip discharging port 2b through which the chips "a" are discharged. The chip carrying mechanism 3 is arranged in the casing 2 so as to extend from the chip introducing port 2a to the chip discharging port 2b.

The chip carrying mechanism 3 is configured to carry the chips "a" dropped through the chip introducing port 2a to the chip discharging port 2b while separating the cutting fluid "b" from the chips "a" and discharge the chips "a" to an outside. Below the chip discharging port 2b, a bucket (which is not illustrated) for collecting the chips "a" is arranged.

The casing 2 is formed into a generally rectangular box shape extending in a front-back direction as seen from the machine front A. The casing 2 includes an accumulation section 5 arranged at a front side to accumulate the cutting fluid "b" dropped from the chip introducing port 2a so as to form a predetermined level, a carrying duct 6 extending continuously from the accumulation section 5 so as to extend obliquely rearward and upward, and a discharge duct 7 extending continuously downward from the upper end portion of the carrying duct 6.

The accumulation section 5 includes a generally flat bottom wall portion 5a, left and right side wall portions 5b and 5b raised from left and right edges of the bottom wall portion 5a, and a top wall portion 5c arranged between the upper edges of the side wall portion 5b and 5b. At the front side portion of the top wall portion 5c, the chip introducing port 2a is formed. The carrying duct 6 and the discharge duct 7 are generally the same in structure as the accumulation section 5.

The chip carrying mechanism 3 includes a pair of left and right drive sprockets 8 and 8 arranged at the boundary portion between the carrying duct 6 and the discharge duct 7, a pair of left and right guide members 9 and 9 arranged at the front side portion in the accumulation section 5, left and right drive chains 10 and 10 wound on the left and right guide members 9 and 9 and the left and right drive sprockets 8 and 8 so as to form a circle respectively, and a number of scraping plates 11 fixed to the left and right drive chains 10 and 10 in a bridged manner at a predetermined intervals in a traveling direction. Here, the reference numerals "13" and "14" denote chain guides which prevent fluttering of the drive chains 10 and also adjust the tensions of the drive chains 10.

The left and right drive sprockets 8 and 8 are fixed to a drive shaft 8a, and this drive shaft 8a is rotatably driven by a drive motor 12.

At the boundary portion between the accumulation section 5 and the carrying duct 6, a drum filter 15 is arranged. This drum filter 15 allows only the cutting fluid "b" to pass through, and includes a filter body 15a having a number of fine apertures (not illustrated) which prevent passing of chips "a" and rotary gears 15b fixed to the filter body 15a and rotatably driven by the drive chains 10. The cutting fluid "b" flowed in this filter body 15a is again supplied to the workpiece processing portion of the machine tool via a filtering device which is not illustrated.

Each scraping plate 11 includes a forward scraping portion 11a configured to come into contact with the upper surface of the partition plate 17, which will be explained later, and is formed to take a forwardly inclined posture with respect to the carrying direction (traveling direction) A (in the counterclockwise direction in FIG. 2). Each scraping plate 11 further includes a reverse scraping portion 11b continuously extended from the forward scraping portion 11a in a bent manner and configured to come into contact with the upper surface of the bottom wall portion 5a of the casing 2 and is formed to take a forwardly inclined posture with respect to the direction B opposite to the carrying direction (traveling direction) A (in the clockwise direction in FIG. 2).

In the casing 2, the partition plate 17 partitioning the inside of the casing 2 into a bottom wall portion 5a side (i.e., a lower space) and a top wall portion 5c side (i.e., an upper space) is arranged. This partition plate 17 is formed by a number of metal flat plates arranged and connected each other, and arranged between the lower side portion 10a and the upper side portion 10b of the circular drive chains 10 so as to be closer to the upper side portion 10b.

The partition plate 17 is bolted to generally L-shaped left and right brackets 19 and 19 attached to the inner surfaces of the left and right side wall portions 5b and 5b of the casing 2 via spacers 18 and 18.

At a portion of the partition plate 17 below the chip introducing port 2a, an opening 17a is formed. In the opening 17a, a lid plate 20 is arranged in an openable and closable manner so as to form a continuous surface with the partition plate 17. The opening 17a has approximately the same area as an area of the chip introducing port 2a. The lid plate 20 is detachably attached to the left and right brackets 19 with a plurality of bolts 22.

The lid plate 20 is configured to be detachable to an outside through the chip introducing port 2a through between the adjacent scraping plates 11' and 11'. When the lid plate 20 is attached, the portion of the partition plate 17 below the chip introducing port 2a becomes in a closed state. On the other hand, when the lid plate 20 is detached, the portion of the partition plate 17 below the chip introducing port 2a becomes in an open state.

Figure 2:
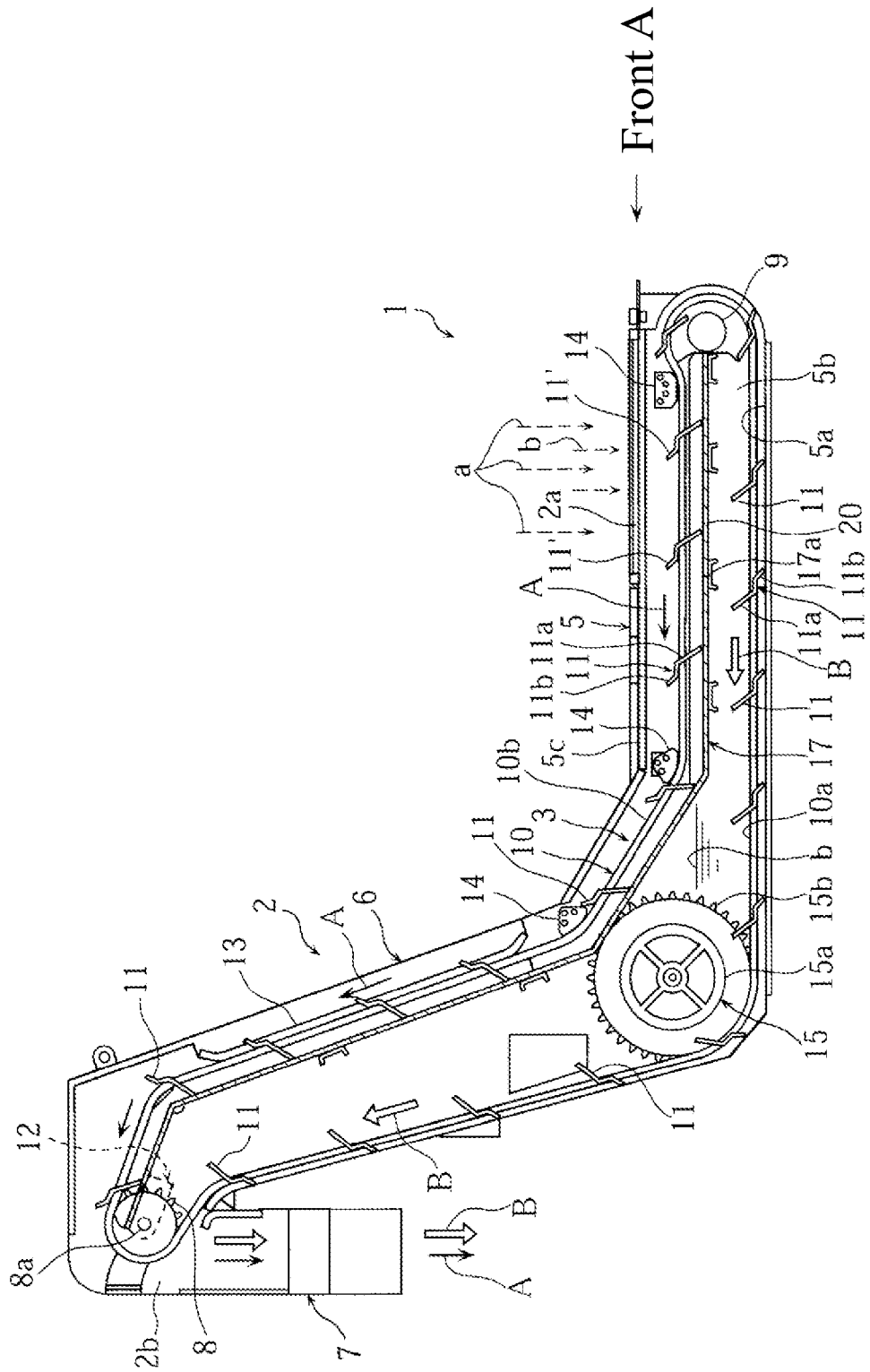
FIG. 2 is a cross-sectional side view of the chip conveyer.
Figure 3:
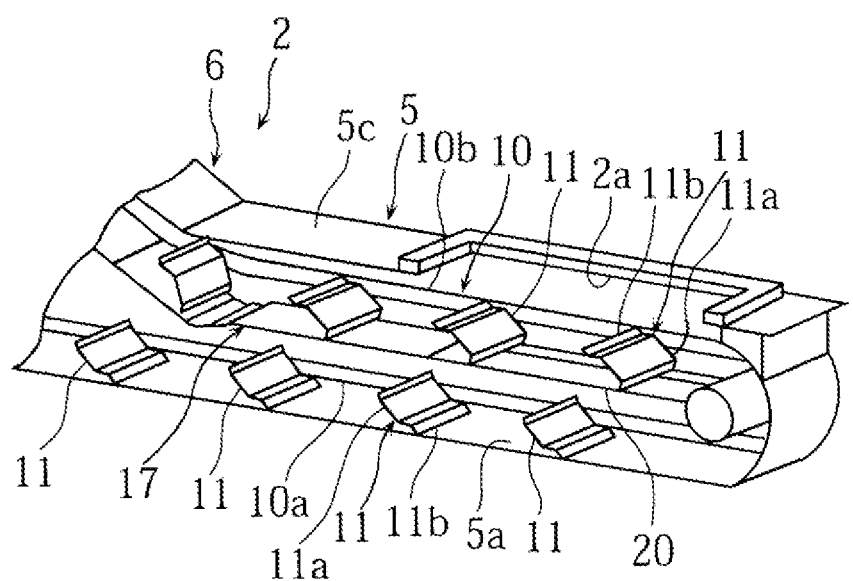
FIG. 3 is a partially broken schematic perspective view of a front portion of the chip conveyer as seen from a left upper portion of the chip conveyer.
Figure 4:
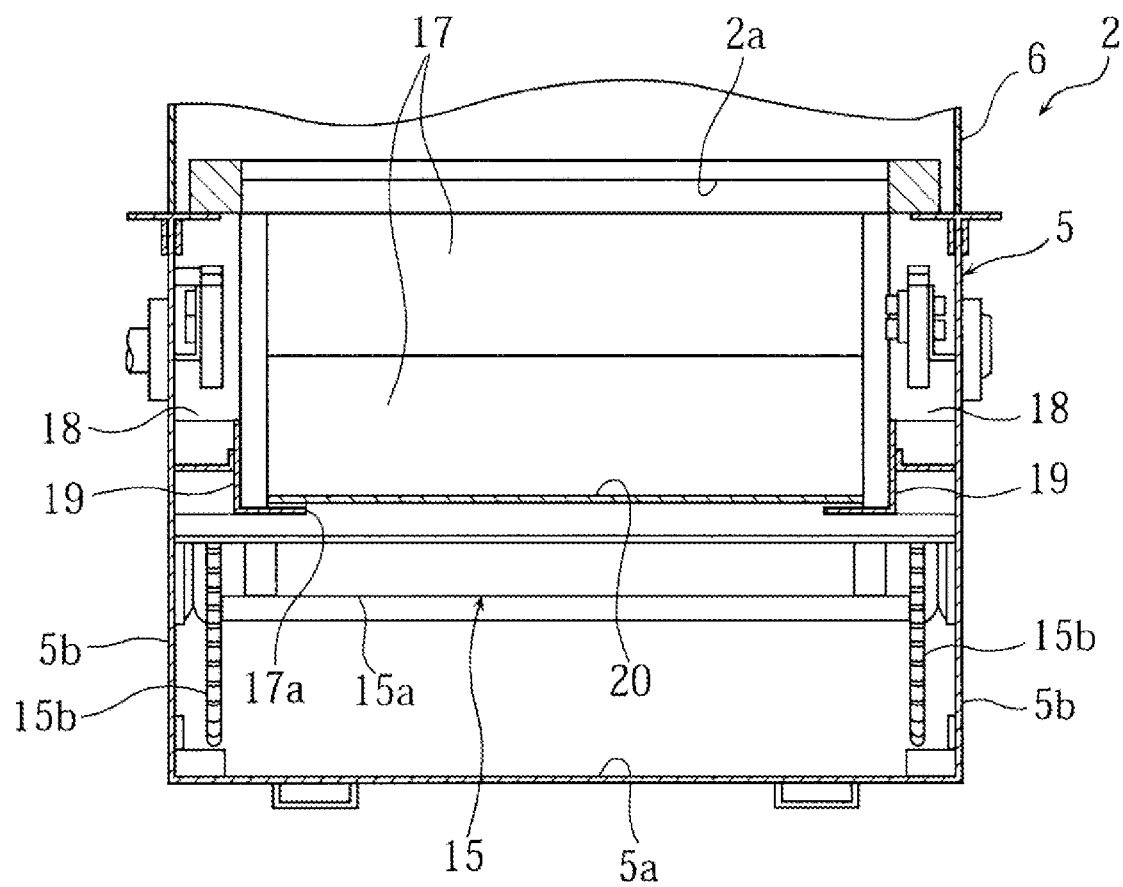
FIG. 4 is a cross-sectional front view of the chip conveyer.
Figure 5:
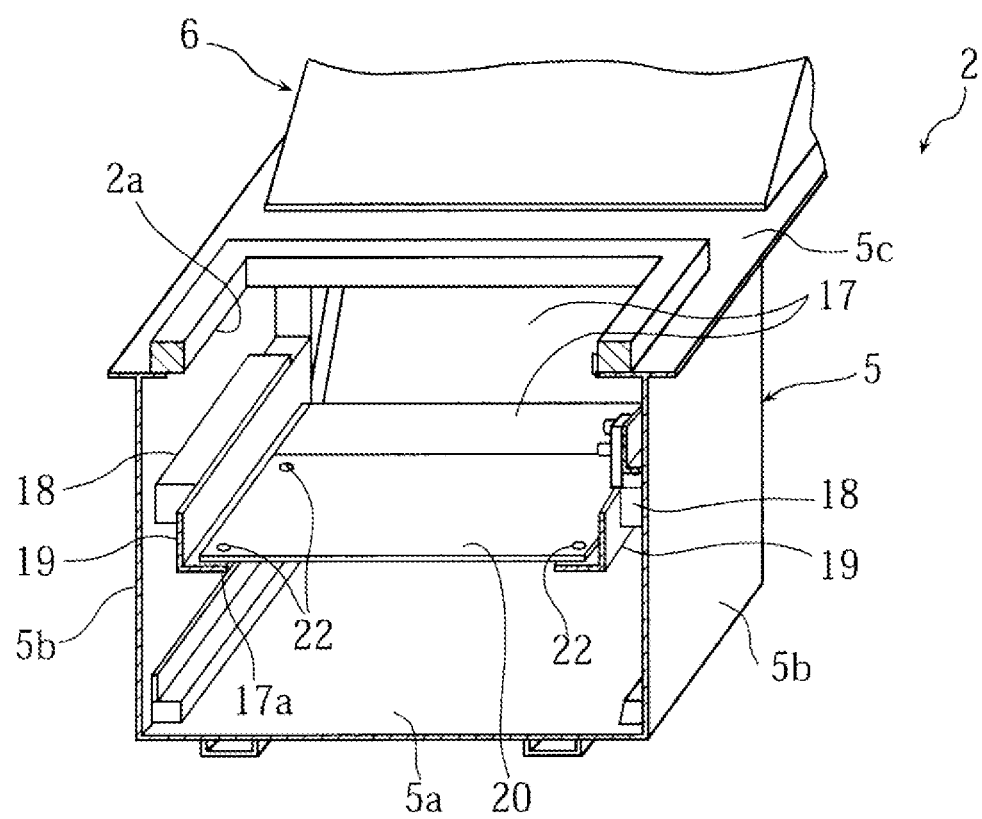
FIG. 5 is a cross-sectional perspective view of the chip conveyer.

In the chip carrying mechanism 3, the drive motor 12 is controlled to switch the rotation direction (i.e., the driving direction) so that when the lid plate 20 is attached and therefore the partition plate 17 is in the closed state, each scraping plate 11 is moved in the direction A in FIG. 2, i.e., in a direction carrying the chips "a" on the partition plate 17 to the chip discharging port 2b through the carrying duct 6, and when the lid plate 20 is detached and therefore the partition plate 17 is in the open state, each scraping plate 11 is moved in the direction B in FIG. 2 opposite to the direction A, i.e., in a direction carrying the chips "a" on the bottom wall portion 5a to the discharging port 2b through the carrying duct 6.

For example, in cases where chips "a" generated by machining are relatively long or large, the lid plate 20 is attached so that the partition plate 17 is in the closed state. The chips "a" and the cutting fluid "b" supplied to the workpiece processing portion are dropped on the lid plate 20 of the partition plate 17 from the chip introducing port 2a. The left and right drive chains 10 are rotatably driven by the drive motor 12 in the direction A which is a counterclockwise direction in FIG. 2, which moves the forward scraping portion 11a of each scraping plate 11 with the forward scraping portion 11a being in contact with the upper surface of the lid plate 20 and the partition plate 17 to continuously carry the chips "a" to the chip discharging port 2b via the carrying duct 6 to thereby discharge the chips "a" to an outside from the discharge duct 7. In this case, the cutting fluid "b" adhering to the chips "a" drops by its own weight to the accumulation section 5 during which the chips "a" and the cutting fluid "b" are being raised in the carrying duct 6. Further, the cutting fluid "b" in the accumulation section 5 is collected by the drum filter 15 and filtered, and then again supplied to the workpiece processing portion.

On the other hand, when the chips "a" are fine or minute chips (hereinafter referred to as "fine chips"), the lid plate 20 is detached so that the partition plate 17 is in the open state. The fine chips "a" and the cutting fluid "b" drop in the casing 2, and the fine chips "a" are deposited on the bottom wall portion 5a of the casing 2 while floating in the cutting fluid "b". The left and right drive chains 10 are rotatably driven in the direction B which is a clockwise direction in FIG. 2, which moves the reverse scraping portion 11b of each scraping plate 11 with the reverse scraping portion 11b being in contact with the upper surface of the bottom wall portion 5a to continuously carry the chips "a" to the chip discharging port 2b via the carrying duct 6.

Here, some of the fine chips "a" floating in the cutting fluid "b" likely accumulate around the drum filter 15 to cause clogging. In this case, although it is difficult to remove the fine chips "a" accumulated in the drum filter 15 only by driving the drive chains 10 in the direction A, it becomes possible to remove them by driving the drive chains 10 in the opposite direction B.

In this embodiment, the portion of the partition plate 17 which partitions an inside of the casing 2 into an upper space and a lower space and is positioned below the chip introducing port 2*a* is constituted by an openable and closable lid plate 20. When the lid plate 20 is attached so that the portion of the partition plate 17 is in the closed state, the carrying direction (driving direction) of the chip carrying mechanism 3 is set to the direction A, and when the lid plate 20 is detached so that the partition plate 17 is in the open state, the carrying direction (driving direction) of the chip carrying mechanism 3 is set to the direction B. Therefore, when the lid plate 20 is attached so that the portion of the partition plate 17 is in the closed state, the chips "a" dropped on the lid plate 20 of the partition plate 17 are discharged by the forward scraping portion 11*a* of each scraping plate 11. On the other hand, when the lid plate 20 is detached so that the portion of the partition plate 17 is in the open state, chips "a" directly dropped on the bottom wall portion 5*a* of the casing 2 via the opening 17*a* of the partition plate 17, and chips "a" floated in the cutting fluid "b" and deposited on the bottom wall portion 5*a* are discharged without the partition plate 17.

In this embodiment as explained above, by merely switching the rotation direction of the drive motor 12 of the chip carrying mechanism 3, the discharging of chips "a" dropped on the partition plate 17 and the discharging of chips "a" floated in the cutting fluid "b" and deposited on the bottom wall portion 5*a* of the casing 2 can be performed. With this, it becomes possible to eliminate a chip conveyer selection considering the material, etc., of a workpiece to be processed, which in turn can eliminate the need of producing chip conveyers depending on the type of chips. As a result, the cost reduction can be attained.

In this embodiment, the lid plate 20 of the partition plate 17 arranged below the chip introducing port 2*a* is configured to be detachable, and the lid plate 20 is configured to be able to be taken out to an outside from between the adjacent scraping plates 11' and 11' via the chip introducing port 2*a*. Therefore, the opening and closing operation below the chip introducing port 2*a* can be performed easily and assuredly.

Embodiment 2

Figure 6A:
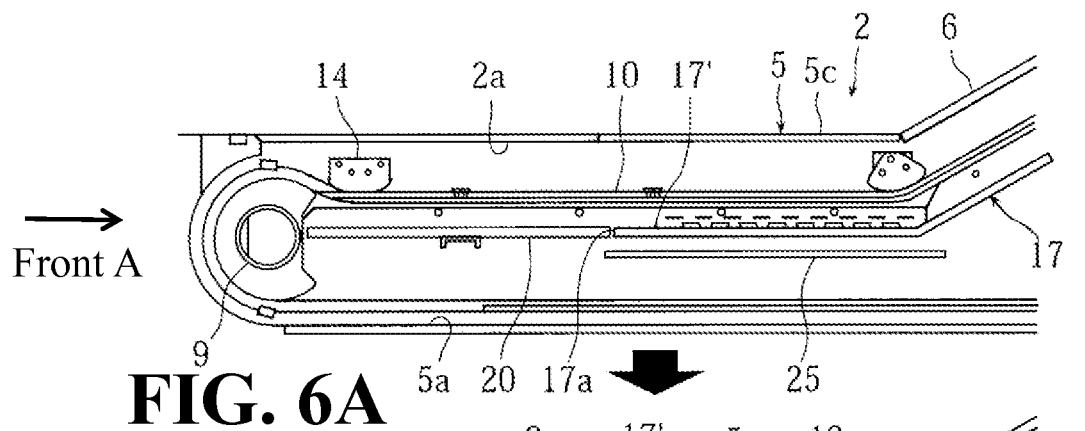
FIGS. 6A, 6B and 6C each shows a cross-sectional side view of a front portion of a chip conveyer according to Embodiment 2 of the present invention.
Figure 6B:
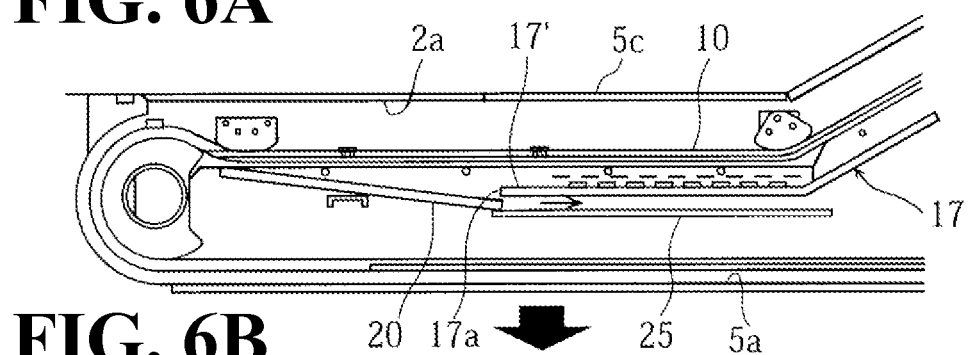
Figure 6C:
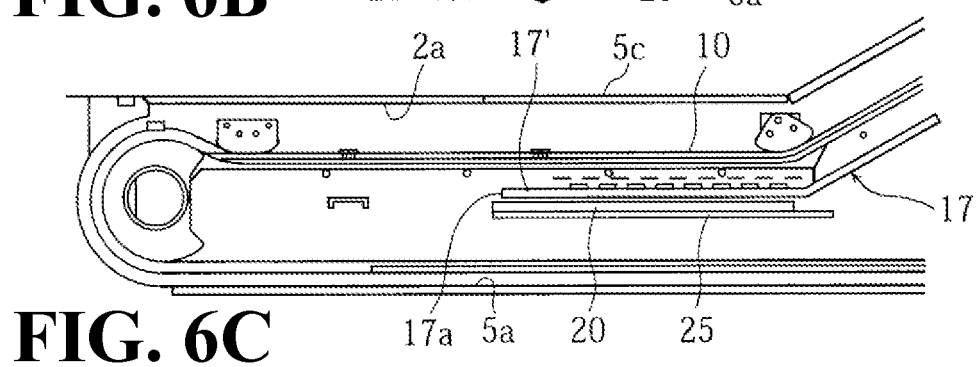

FIGS. 6A to 6C show the opened/closed state of the lid plate 20 according to Embodiment 2 of the present invention. In the drawings, the same reference numeral as in FIG. 2 shows the same or corresponding portion.

In this embodiment, the lid plate 20 of the partition plate 17 arranged to close the opening 17*a* below the chip introducing port 2*a* of the casing 2 is configured to be slidable so as to be positioned at a portion 17' of the partition plate 17 adjacent to the lid plate 20.

Below the portion 17' of the partition plate 17, rail members 25 for slidably guiding and supporting the lid plate 20 are provided. When making the portion of the partition plate to an open state, bolts are detached and the lid plate 20 is slid on the rail members 25. Then, the lid plate 20 is fixed to the rail members 25.

In this embodiment, the lid plate 20 of the partition plate 17 arranged below the chip introducing port 2*a* is configured to be slidable so as to be positioned below the portion 17' of the partition plate 17 adjacent to the lid plate 20. Therefore, the opening/closing of the portion of the partition plate 17 below the chip introducing port can be performed easily and assuredly without taking the lid plate 20 out to an outside.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A chip conveyer for a machine tool, comprising:
   a casing including a chip introducing port and a chip discharging port; and
   a chip carrying mechanism arranged in the casing so as to extend at least from the chip introducing port to the chip discharging port,
   wherein chips dropped in the casing through the chip introducing port are carried to the chip discharging port by the chip carrying mechanism,
   wherein a partition plate partitioning an inside of the casing up and down is arranged in the casing, and at least a portion of the partition plate below the chip introducing port is configured to be openable and closable, and
   wherein a carrying direction of the chip carrying mechanism when the portion of the partition plate is in an open state and a carrying direction of the chip carrying mechanism when the portion of the partition plate is in a closed state are set to be opposite directions.

2. The chip conveyer as recited in claim 1,
wherein the chip carrying mechanism includes a pair of circular drive chains and scraping plates fixed to the drive chains in a bridged manner at predetermined intervals, and
wherein the portion of the partition plate below the chip introducing port is detachably provided so as to be taken out between adjacent scraping plates.

3. The chip conveyer as recited in claim 1,
wherein the portion of the partition plate below the chip introducing port is configured to be slidable so as to be positioned at a position adjacent to the portion of the partition plate.

4. A chip conveyer for a machine tool, comprising:
a casing including a chip introducing port and a chip discharging port;
a chip carrying mechanism arranged in the casing so as to extend from the chip introducing port to the chip discharging port, the chip carrying mechanism being configured to carry chips dropped in the casing through the chip introducing port to the chip discharging port; and
a partition plate arranged in the casing so as to partition an inside of the casing into an upper space and a lower space,
wherein the partition plate includes an opening formed below the chip introducing port and a lid plate detachably closing the opening, and
wherein the chip carrying mechanism is configured to change a driving direction thereof depending on whether the partition plate is in a closed state in which the lid plate closes the opening or the partition plate is in an open state in which the lid plate is detached from the opening.

5. The chip converter as recited in claim 4,
wherein the chip carrying mechanism includes a pair of drive chains and scraping plates fixed to the drive chains at predetermined intervals, and
wherein each of the scraping plates includes a forward scraping portion configured to come into contact with an upper surface of the partition plate and a reverse scraping portion configured to come into contact with an upper surface of a bottom wall portion of the casing.

6. The chip converter as recited in claim 5,
wherein the forward scraping portion is formed to take a forwardly inclined posture with respect to a traveling direction of the forward scraping portion, and
wherein the reverse scraping portion is formed to take a forwardly inclined posture with respect to a traveling direction of the reverse scraping portion.

7. The chip converter as recited in claim 4,
wherein the lid plate is configured to be taken out between adjacent scraping plates.

8. The chip conveyer for a machine tool as recited in claim 4,
wherein the lid plate is configured to be positioned below a section of the partition plate adjacent to the opening when the partition plate is in the open state.

9. The chip conveyer as recited in claim 4,
wherein the casing includes an accumulation section arranged at a front side of the casing to accumulate a cutting fluid dropped from the chip introducing port, a carrying duct extending continuously from the accumulation section so as to extend obliquely rearward and upward, and a discharge duct extending continuously downward from an upper end portion of the carrying duct.

* * * * *